United States Patent
Dabel

(10) Patent No.: US 12,502,466 B2
(45) Date of Patent: Dec. 23, 2025

(54) SYSTEM AND METHOD FOR MAINTAINING WORKING PHYSIOLOGICAL RESIN BEAD GEL COMPOSITION WITHIN AN ARTIFICIAL KIDNEY

(71) Applicant: Cath Dry Global Corp., Los Angeles, CA (US)

(72) Inventor: Pascal Dabel, Los Angeles, CA (US)

(73) Assignee: Cath Dry Global Corp., Los Angeles, CA (US)

( * ) Notice: Subject to any disclaimer, the term of this patent is extended or adjusted under 35 U.S.C. 154(b) by 0 days.

(21) Appl. No.: 18/864,699

(22) PCT Filed: May 12, 2022

(86) PCT No.: PCT/US2022/029015
§ 371 (c)(1),
(2) Date: Nov. 11, 2024

(87) PCT Pub. No.: WO2023/219623
PCT Pub. Date: Nov. 16, 2023

(65) Prior Publication Data
US 2025/0090735 A1    Mar. 20, 2025

(51) Int. Cl.
*A61M 1/16*       (2006.01)
*A61M 1/26*       (2006.01)
(Continued)

(52) U.S. Cl.
CPC .......... *A61M 1/1678* (2013.01); *A61M 1/262* (2014.02); *A61M 1/267* (2014.02);
(Continued)

(58) Field of Classification Search
CPC .... A61M 1/1678; A61M 1/262; A61M 1/267; A61M 27/002; A61M 60/152;
(Continued)

(56) References Cited

U.S. PATENT DOCUMENTS 4,085,047 A * 4/1978 Thompson ......... B01D 19/0031
  96/204
4,581,141 A * 4/1986 Ash ..................... A61M 1/3687
  210/502.1
(Continued)

OTHER PUBLICATIONS

Francis, Jessica, et al. "Digital nanoliter to milliliter flow rate sensor with in vivo demonstration for continuous sweat rate measurement." *Lab on a Chip* 19.1 (2019): 178-185.
(Continued)

*Primary Examiner* — Philip R Wiest
(74) *Attorney, Agent, or Firm* — Frost Brown Todd LLP

(57) ABSTRACT

A mechanical kidney transplant may include four modules to interconnect and clean blood. Blood flowing through at least one of the modules flows through dialyzer fiber/tubes, while an area surrounding that fiber/tubes receives a flow of
(Continued)

physiological resin gel of a design that will remove impurities from the blood. A subsystem of one or more sensors (a) detects and sets an alarm condition when the physiological resin gel is degraded and may need partial or full replacement, and/or (b) detects and sets an alarm condition if blood leakage has occurred within the module.

16 Claims, 2 Drawing Sheets

(51) Int. Cl.
 *A61M 27/00* (2006.01)
 *A61M 60/152* (2021.01)
 *A61M 60/279* (2021.01)
 *A61M 60/37* (2021.01)

(52) U.S. Cl.
 CPC ........ *A61M 27/002* (2013.01); *A61M 60/152* (2021.01); *A61M 60/279* (2021.01); *A61M 60/37* (2021.01); *A61M 2205/15* (2013.01); *A61M 2205/18* (2013.01); *A61M 2205/3313* (2013.01); *A61M 2205/3317* (2013.01); *A61M 2205/3334* (2013.01); *A61M 2210/1089* (2013.01)

(58) Field of Classification Search
 CPC ................ A61M 60/279; A61M 60/37; A61M 2205/15; A61M 2205/18; A61M 2205/3313; A61M 2205/3317; A61M 2205/3334; A61M 2210/1089
 See application file for complete search history.

(56) References Cited

U.S. PATENT DOCUMENTS

| | | | |
|---|---|---|---|
| 4,769,037 A | 9/1988 | Midcalf | |
| 5,092,886 A | 3/1992 | Dobos-Hardy | |
| 6,561,996 B1* | 5/2003 | Gorsuch | A61M 1/3417 |
| | | | 604/4.01 |
| 11,491,268 B1* | 11/2022 | Dabel | A61M 1/3626 |
| 2006/0036332 A1 | 2/2006 | Jennings | |
| 2012/0289881 A1 | 11/2012 | Lyu et al. | |
| 2019/0117869 A1 | 4/2019 | Handelman et al. | |
| 2022/0126003 A1* | 4/2022 | Hahn | G01M 3/38 |

OTHER PUBLICATIONS

Nephron 1 Implantable Mechanical Kidney. Via the internet <http://www.nephron1.com/> Accessed on Nov. 11, 2024, 10 pages.

Zarifi, Mohammad Hossein, et al. "Noncontact and nonintrusive microwave-microfluidic flow sensor for energy and biomedical engineering." *Scientific reports* 8.1 (2018): 139.

International Search Report and Written Opinion dated Aug. 1, 2022, for International Application No. PCT/US2022/029015, 7 pages.

* cited by examiner

SYSTEM AND METHOD FOR MAINTAINING WORKING PHYSIOLOGICAL RESIN BEAD GEL COMPOSITION WITHIN AN ARTIFICIAL KIDNEY

This application is a national stage application, filed under 35 U.S.C. § 371, of International App. No. PCT/US/2022/029015, entitled "System and Method for Maintaining Working Physiological Resin Bead Gel Composition Within an Artificial Kidney," filed on May 12, 2022, the disclosure of which is incorporated by reference herein.

BACKGROUND

The embodiments described herein relate generally to medical devices, and more particularly to a subsystem of a mechanical kidney implant that ensures the material designed to clean blood retains its effectiveness.

Patients who must undergo hemodialysis often have poor quality of life. Dialysis is costly and profoundly inconvenient and uncomfortable to those who need it. Life expectancy for a dialysis patient is usually less than 10 years.

Recently advances have occurred in the design of an artificial kidney that potentially eliminates the need for conventional dialysis. Disclosed at www.nephron1.com, this artificial kidney in vivo will operate with three or four main subsystems, conceived as modules.

First, a removable exterior module can be accessed by the patient or a caregiver, and contains a status display screen that can supply various messages. Within this exterior module, pathways may exist for both the patient's untreated (unclean) blood and a physiological resin bead composition. These pathways may comprise dialyzer fibers for the untreated blood, and a physiological resin bead gel flowing in a counter current flow around the blood. The physiological resin bead gel itself may comprise agarose beads of a particular size that mimics the size of red blood cells, combined with a number of electrolytes and sugars that mimic the balance and concentration of such compounds found in clean blood.

Second, removal of the exterior module may expose the face of an interface module—this one crossing between the outside and inside of the patient's body. The interface module will have ports for the inflow/outflow of blood and of physiologic resin bead gel between the exterior module and another, body-interior module. The interface module may have a variety of injection ports, including a physiologic resin bead gel adjustment fluid injection port for refilling/changing/draining the body-interior module of such materials. Battery charging ports may also be provided for one or more batteries residing in the body-interior module (or the storage module, also described below).

Third, the body-interior module may contain pumps, separately for blood (to mechanically power its passage through the interface module and the exterior module) and for physiologic resin bead gel. A bypass may exist to maintain blood flow inside the body if the exterior module is removed. Connections may exist for arterial blood (into the body-interior module) and venous blood (out of the body-interior module), the latter potentially being in clean form after passage through the modules herein described. The body-interior module also may contain a cleaning mechanism for the physiologic resin bead gel after it has picked up impurities from unclean blood after passage through the exterior module (e.g., through osmosis/diffusion/convection). This cleaning mechanism may include a centrifuge. The centrifuge may be coupled to the patient's urethra, thus allowing passage of impurities outside of the body through otherwise normal urinary bladder physiology.

Finally, a storage module may exist, also implanted in the patient's body, to store a number of fluids needed for operation, such as physiologic resin bead gel, blood anticoagulation fluids and epogen, as well as pumps for such materials. Each stored fluid area may have its own line interconnecting with the body-interior module, and may include sensors (such as volume sensors so that refill through injection ports may be recommended, as well as sensors for pressure, temperature, pH, urea nitrogen level and the like). All sensors may interoperate through electrical or wireless/Wi-Fi/Bluetooth communications to any one or multiple other modules, and/or the status display screen on the face of the exterior module.

While the foregoing system as conceived has facilities for the removal and replacement of physiological resin bead gel (e.g., through the interface module), it lacks a subsystem for determining and reporting that such removal and replacement is needed. It will become important for long term use of such a system to ensure that the physiological resin bead gel is maintained in a high functioning state.

SUMMARY OF THE INVENTION

An improved artificial kidney system includes a system and method for maintaining the efficacy of a physiological resin bead gel. This is embodied within a new subsystem, which can be alternatively deployed and configured in several ways. Sensors monitor either bead shape, smoothness of flow, or similar indicators of degradation of the physiological resin bead gel. When such sensors detect degradation below a threshold, an alert is given to the patient and/or a caregiver. The patient and/or caregiver can then use the injection ports to repair or replace the physiological resin bead gel, or sufficient amounts thereof, to restore the artificial kidney to an optimal working state.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device, system and method of the present disclosure may be used as a mechanical kidney implant and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

Figure 1:
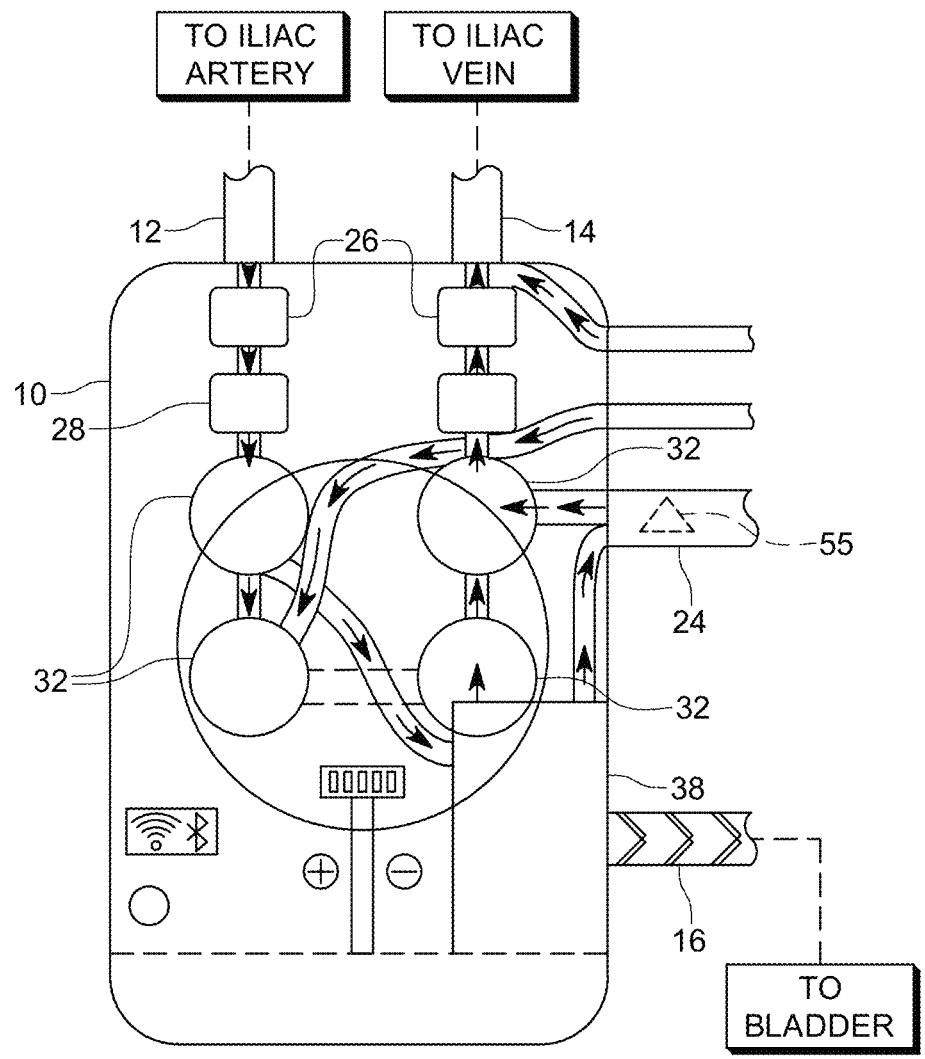
FIG. 1 is a front schematic view of one embodiment of the present disclosure, showing the placement of parts, particularly of a body-interior module.
Figure 2:
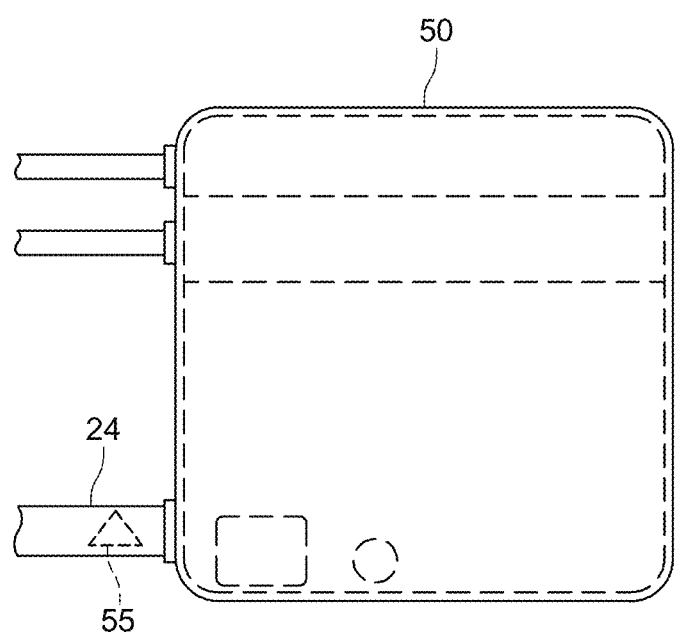
FIG. 2 is a front schematic view of one embodiment of the present disclosure, showing the placement of parts, particularly of a storage module.

By way of example, and referring to FIGS. 1-2, some embodiments of the invention deploy improvements to the above-described plurality of modules that operatively connect to one another to comprise a replacement kidney system. Operation and construction of the external module and of the interface module will not be discussed, but may be referred to indirectly in the following disclosure.

The body-interior module may comprise a housing 10 designed to house the components. A plurality of pump modules, such as 32A, 32B, 32C and 32D, may be positioned within housing 10. An arterial line 12 may extend from the housing 10 and be designed to attach to the iliac artery. A venous line 14 may extend from the first module housing 10 and be designed to attach to the iliac vein. A ureteral line 16 may extend from the first module housing 10 and be designed to attach to the bladder. Thus, unclean arterial blood may flow from the iliac artery through the arterial line 12 and into the housing 10 for processing. While inside the housing 10, the blood may first flow through a pressure and resistance monitor 26 and a urea nitrogen sensor 28 before entering first pump module 32A. Resin gel may be regenerated/cleaned in the resin gel regeneration module 38, which may be a centrifuge.

Resin gel enters housing 10 from pump line 24, itself coupled to storage module 50. Advantageously, sensor 55 exists in or adjacent to pump line 24 (either in housing 10 or at the corresponding pump line location of storage module 50, or both). Sensor 55 may be of several varieties, or a combination of several. These may include a bead shape monitor, a flow smoothness monitor and/or a viscosity monitor. Sensor 55 may itself be a single compact unit, or may otherwise be coupled to a separate processing unit (not shown) adapted to receive its signals. Processing will determine a threshold which will then be compared to an alarm value. Sensors may work on optical, ultrasound, laser or electrical principles.

For example, blood flow measurement devices are well known, including solutions embodied as electromagnetic, laser Doppler, ultrasonic Doppler and microwave blood flow meters. Trends are toward miniaturization. For example, see Zafiri et al., Noncontact and Nonintrusive Microwave-Microfluidic Flow Sensor for Energy and Biomedical Engineering, Scientific Reports, 8:139 (Jan. 9, 2018). Zafiri et al. describe measuring the flow of liquid through a microchannel passing over a thin circular membrane, to deform the membrane and alter the effective permittivity of the medium above the sensor. A thin film membrane thus enables monitoring of fluid behavior, where different bulging occurs depending on flow rate. Behavior is monitored using planar microwave ring resonator. Other examples may include Stamper et al., Digital nanoliter to milliliter flow rate sensor with in vivo demonstration for continuous sweat rate measurement. *Lab Chip* 19, 178-185 (2019).

Alarm value thresholds may be based on a calibration mode that works as follows. Upon activation of a mechanical kidney as hereindescribed, the kidney contains fresh undamaged physiological resin bead gel. Once flow has started using such undamaged gel, an actuator on the exterior module coupled to a processing unit may be activated to start a calibration mode. The calibration mode may then collect data for a period of time (e.g., 1 minute to 5 minutes) to determine a parameter and its variance (e.g., flow rate mean and one standard deviation around the mean; likewise for any other parameter in use for this purpose, such as viscosity mean and standard deviation). The mean and variance may be stored as a baseline upon completion of the calibration mode.

Alternatively or in addition, with reference to FIG. 2 showing pump line 24 at the storage module 50, sensor 55 may exist in or adjacent to pump line 24 at or in the storage module 50.

If the threshold for a sensor value reaches the alarm value indicating bead shape degradation (e.g., more than 30% of beads are malformed or misshapen, flow rate degrades to one standard deviation below the initial setup mean), a signal will be sent to raise an audible and/or visual message to the patient and/or caregiver, such as using the exterior housing and its display screen. If the threshold for a sensor value reaches the alarm value indicating degraded flow rates of the physiological resin bead gel (e.g., exceeding the selected variance below or around the calibration mean) a like signal will be sent to raise an audible and/or visual message to the patient and/or caregiver, such as using the exterior housing and its display screen. And if the threshold for a sensor value reaches the alarm value indicating too high or too low viscosity (e.g., exceeding the selected variance below or around the calibration mean) a signal will be sent to raise an audible and/or visual message to the patient and/or caregiver, such as using the exterior housing and its display screen.

Alarm monitoring may occur as follows. Any time the unit thereafter is not in calibration mode, it is in measurement mode. In such mode, data collection will occur for set periods of time (e.g., 1 minute, 5 minutes, etc.). These may be separated periods of time, or rolling periods of time wherein sequential periods contain overlapping subperiods. This operation may yield a parameter mean. The parameter mean may then be compared against the calibrated mean and variance to determine if that threshold has been exceeded. To reduce "noise" that may create false positive alarms, an alarm condition may be established only when a certain number of sequential periods or windows (e.g. three) result in the alarm condition. Alternatively or in combination, the range around the calibration mean can be other than one standard deviation—for example, two, or one half, or some other constant multiples of standard deviation may otherwise be used to set the alarm value. The system may include adjustability of such variances by the caregiver during use via the exterior module actuators, to curtail false alarms.

In practice, a patient or caregiver confronted with an alarm condition may choose to see a professional nephrologist to address it (if the caregiver is not the nephrologist herself or himself). One way such an alarm may be addressed is to remove the exterior module to access the injection ports on the interface module. From there, an operation may be performed to purge degraded physiological resin bead gel and restore it with new (in full, or partially at sufficient volumes to restore effective operation). Thereafter, the external module may be reattached, the alarm cleared, and blood cleaning recommenced.

Additional sensors, or alternative forms of the previously described sensors, may optionally be employed in the artificial kidney. For example, Hall effect sensors are known (for example, the Mini-HA-P from Bosch) that provide incremental measurement of rotational speed. Such a sensor can be adapted to measure the speed of blood or of resin gel as it passes through any of the above-described subsystems. For example, a rotating vane form in conjunction with a ferromagnetic substance and/or part may be used (e.g., paddle wheel, pelton or turbine style), such that the Hall effect indicates flow speed of a fluid for processing in other system parts (e.g., a processing unit). Other options for flow sensors (and by implication, resin gel integrity sensors) may include ultrasound flow meters, magnetic pistons, and any other technologies currently deployed within standard dialysis tubing. For example, Gems Sensors has made flow, level and pressure sensors for dialysis machines. Its FS-W flow sensor works as a piston-type to react to flow. A magnetic piston is displaced by flow, then a sealed reed switch within the unit's body actuates. Afterward when pressures lower from decreased flow, a magnet deactuates the same switch.

A blood leak detection device may also advantageously be incorporated within the exterior module. In the exterior module, blood and resin gel are separated by a membrane for diffusion, osmosis and convection. If the semipermeable tubes holding the blood become damaged, and blood leaks into the resin gel compartment, an alarm triggers. Blood leak monitors are currently used in standard hemodialysis machines. For example, a fluid pressure sensor may monitor blood through the tubes, and register a pressure drop in the presence of leakage. Alternatively, a blood leak monitor may be situated in the resin gel flow area, to alarm and shut off the blood pump when blood is detected. The presence of blood in the resin gel (like in dialysate of a standard hemodialysis machine) usually indicates membrane rupture and may be caused by a TMP exceeding 500 mmHg. Although rare, membrane rupture can be potentially life threatening when nonsterile resin gel contacts blood. For sensors operating within the resin gel, a two-color light source (transmitter/sensor) (red and green) may monitor the clarity of the resin gel. Green light (562-575 nm wavelength) gets absorbed by blood, and thus would indicate a leak.

Though resin gel will be naturally heated to body temperature since the overall system involves implantation in the pelvis, a temperature sensor (in any of the modules) may also advantageously be used. If resin gel temperature is outside of 36° C. to 42° C., this will trigger an alarm condition, including optionally stopping the resin gel pump.

Other sensors may include bubble sensors to monitor for the presence of air in a patient's veins (and trigger an alarm condition) and occlusion sensors to prevent blockage of either blood or resin gel.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

I claim:

1. In an implantable artificial kidney system comprising a plurality of pumps, including at least a first pump for flowing blood through dialysis tubing and a second pump for flowing physiological resin gel through a module, wherein the resin gel flows in the module through an area surrounding the dialysis tubing that contains the flowing blood and collects blood waste products for later deposit into a patient's urethra, the improvement comprising:
   (i) a physiological resin gel flow meter, and
   (ii) a processing unit coupled with said flow meter,
   wherein the processing unit triggers an alarm when physiological resin gel is sensed to have integrity below a threshold.

2. The system of claim 1, wherein the flow meter operates on the Hall effect principle.

3. The system of claim 2, wherein the flow meter includes a rotating portion in fluid communication with flowing physiological resin gel, and the Hall effect is created by means of a magnetic piece or portion on said rotating portion.

4. The system of claim 3, wherein the rotating portion comprises a rotating vane.

5. The system of claim 4, wherein the rotating vane is selected from one or more of the following styles: paddle wheel, pelton or turbine.

6. The system of claim 2, wherein the flow meter comprises a reed switch such that flow pressure above a threshold activates said reed switch to actuate the sensor, and further comprises an opposing magnet whereby pressure below the threshold causes a magnetic force that deactuates the sensor.

7. The system of claim 1, wherein the module further comprises a blood leakage detection sensor.

8. The system of claim 7, wherein the blood leakage detection sensor comprises a green optical sensor.

9. In a method for using an implantable artificial kidney to clean blood, wherein the method comprises operating a plurality of pumps, including at least a first pump for flowing blood through dialysis tubing and a second pump for flowing physiological resin gel through a module, wherein the resin gel flows in the module through an area surrounding the dialysis tubing that contains the flowing blood and collects blood waste products for later deposit into a patient's urethra, the improvement comprising:
   (i) activating a physiological resin gel flow meter,
   (ii) receiving the output of the flow meter at a processing unit, and
   (iii) triggering an alarm when physiological resin gel is sensed to have integrity below a threshold.

10. The method of claim 9, wherein the flow meter operates on the Hall effect principle.

11. The method of claim 10, wherein the flow meter includes a rotating portion in fluid communication with flowing physiological resin gel, and the Hall effect is created by means of a magnetic piece or portion on said rotating portion.

12. The method of claim 11, wherein the rotating portion comprises a rotating vane.

13. The method of claim 12, wherein the rotating vane is selected from one or more of the following styles: paddle wheel, pelton or turbine.

14. The method of claim 10, wherein the flow meter comprises a reed switch such that flow pressure above a threshold activates said reed switch to actuate the sensor, and further comprises an opposing magnet whereby pressure below the threshold causes a magnetic force that deactuates the sensor.

15. The method of claim 9, wherein the module further comprises a blood leakage detection sensor.

16. The method of claim 15, wherein the blood leakage detection sensor comprises a green optical sensor.

* * * * *